United States Patent [19]

Longman et al.

[11] Patent Number: 5,406,540
[45] Date of Patent: Apr. 11, 1995

[54] OPTICAL DISK RECORDING PERFORMANCE

[75] Inventors: Robert J. Longman, Cambridge; Peter R. Helfet, London; Quentin J. Lister; Mark J. Broadbent, both of Cambridge, all of Great Britain

[73] Assignee: Plasmon Data Systems, Inc., Milpitas, Calif.

[21] Appl. No.: 70,461
[22] PCT Filed: Dec. 10, 1991
[86] PCT No.: PCT/GB91/02186
§ 371 Date: Nov. 22, 1993
§ 102(e) Date: Nov. 22, 1993
[87] PCT Pub. No.: WO92/10834
PCT Pub. Date: Jun. 25, 1992
[51] Int. Cl.⁶ .............................................. G11B 7/00
[52] U.S. Cl. ..................................... 369/116; 369/110
[58] Field of Search ................. 369/100, 116, 110, 53, 369/59

[56] References Cited

U.S. PATENT DOCUMENTS

| | | | |
|---|---|---|---|
| 4,606,016 | 8/1986 | Verboom et al. | 369/54 |
| 4,648,085 | 3/1987 | Shimonou | 369/54 |
| 4,680,594 | 7/1987 | Bracht | 369/45 |
| 5,101,396 | 3/1992 | Takeuchi et al. | 369/116 |

FOREIGN PATENT DOCUMENTS 0182127  5/1986  European Pat. Off. .
0420252  4/1991  European Pat. Off. .

Primary Examiner—Paul M. Dzierzynski
Assistant Examiner—Don Wong
Attorney, Agent, or Firm—Poms, Smith, Lande & Rose

[57] ABSTRACT

A method and apparatus for improving optical disk recording performance is disclosed, which comprises reading data from an optical disk while writing data to the disk in order to verify the data, to control the power of the recording laser and to prevent overwriting of the disk.

15 Claims, 3 Drawing Sheets

OPTICAL DISK RECORDING PERFORMANCE

This invention relates to the improvement of optical disk recording performance.

During the recording process of writable optical disks, data is written as the disk rotates. To check that the data was written correctly, it is read back from the disk (usually known as verifying the data) on the following revolution. It therefore takes two revolutions of the disk to successfully write and verify data.

We have found that the time to write and verify data can be halved by reading the data from the disk while writing it (Direct Read During Write, DRDW).

Write Once optical disks (WORM disks) made by Plasmon Data Systems use a 'moth eye' texture as the recording medium (see, for example, U.S. Pat. Nos. 4,616,237; 4,786,585; 4,724,444; and 4,758,307). Marks written by the laser form very quickly (typically 5-20 ns). Mark formation can be detected by monitoring the read photodiode during writing (see FIG. 1).

Accordingly, one aspect of the present invention provides a method of improving optical disk recording performance which comprises writing data to an optical disk with a write laser so as to form marks in the disk, reading said data immediately by monitoring the formation of said marks with a read photodiode during writing, characterised in that a) said read photodiode is connected to a pulse detector arranged so as to measure the amplitude of a detected signal that was generated by the laser beam and has reflected from the marks being formed.

b) the power of said write laser is controlled as a function of the amplitude of a detected signal that was generated by the laser beam and has reflected from the marks being formed.

If every bit of data is written successfully there will be no errors when reading the data. Indeed, the read channel error correction can cope with several bits in error before reporting a verify failure.

The pulse detector is capable of detecting marks forming on the disk surface during write. If the normal mark formation is not seen, it is a bad mark, or bit in error, By simply counting the number of bad marks during writing, data which will pass the verify read can be positively identified by observing a low count (of the order of a few bits) on the bad pulse counter.

In cases of few bits in error being detected, no verification is required.

If more than a few bad marks are detected, the normal verify sequence is triggered. This will test whether the error correction can cope with the number of bits in error.

BRIEF DESCRIPTION OF THE DRAWINGS

FIG. 2 shows the distribution of numbers of bits in error in sectors on a typical Plasmon disk. Most sectors have no bits in error, and so a high hit rate of zero counts can be expected (approximately 99.3%). If two bits in error are taken as acceptable, the hit rate would be 99.8%. The time to perform most writes should therefore be halved.

Recording marks on optical disks requires accurate control of laser power. A small percentage change in the write power will cause a dramatic difference in the written mark size.

Accordingly, in the present invention, there is provided laser power control using feedback photodiodes within the laser module to provide the desired laser power. Outside of the laser module, optical elements direct the light to and from the disk surface.

In normal operation the optical elements get dirty with airborne dust, smoke particles etc. Each dirty surface reduces the laser power by a (small) percentage. The optical disk surface can also get dirty causing further signal loss.

There is a greater latitude in laser power during reading due to careful circuit design, while accurate write laser power is demanded by the physical properties of the disk. Writing data will become unreliable long before reading is impaired.

In practice, Plasmon have found the problem may cause poor disk drive performance (many write-retry attempts), with possible loss of data.

Figure 1:
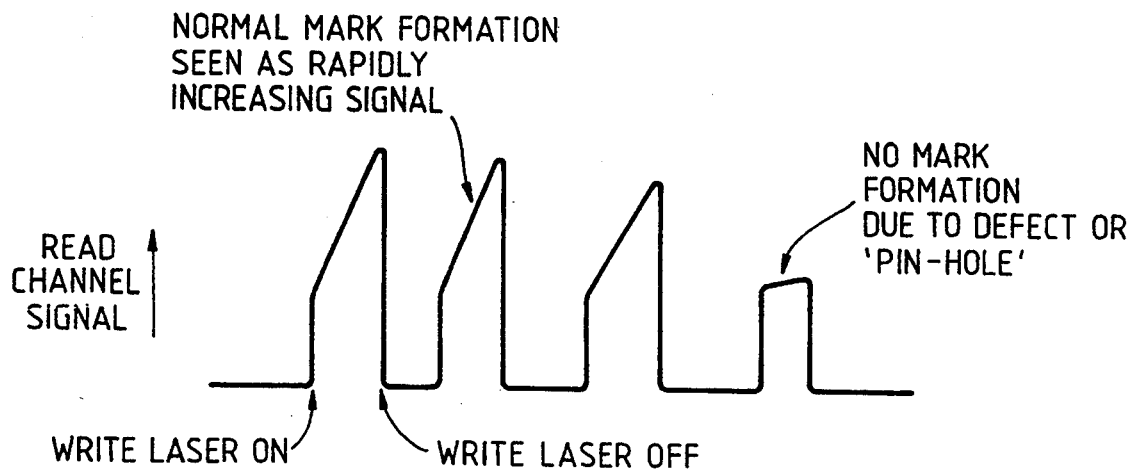
FIGS. 1 and 4-6 illustrate the characteristics of a write laser with respect to a detected signal.
Figure 2:
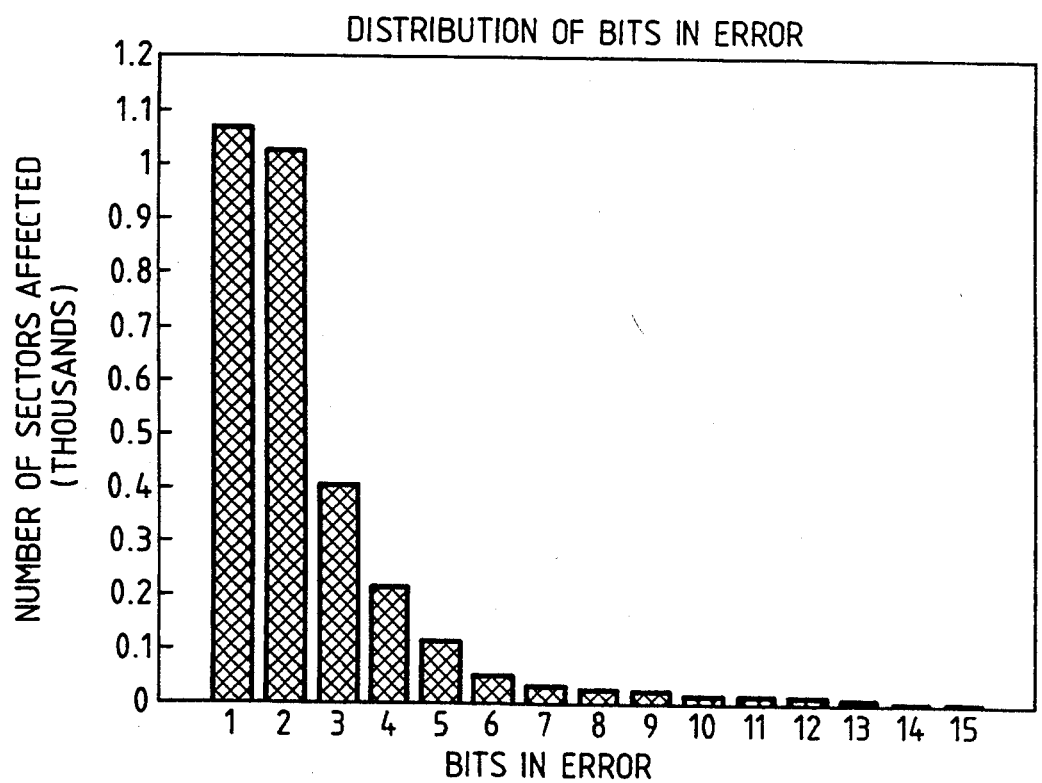
FIG. 2 shows the distribution of number bits in errors in sectors.
Figure 3:
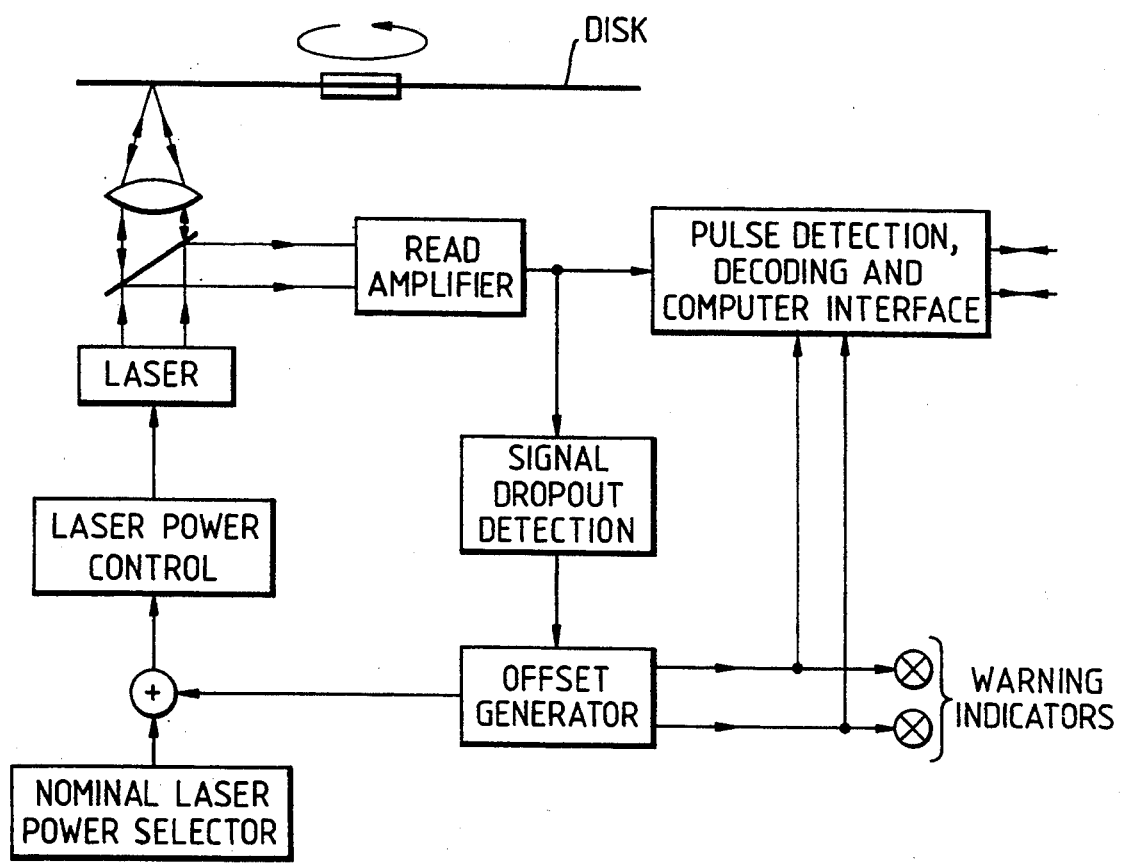
FIG. 3 shows the apparatus of the present invention.

By monitoring the mark formation during writing, poorly formed, and low amplitude marks can be detected. It is possible to use the written mark amplitude to adjust the laser power up or down as necessary. By careful use of time constants in the control circuit, disk defects should not cause sudden glitches in the write power (see FIG. 3).

When the drive control attempts to increase the laser power more than a given percentage, the user can be warned that the optical elements, or disk are in need of cleaning.

A second level of warning can be set when the maximum laser power has been reached, informing the user that the write performance has been impaired due to an obscured optical path.

Write once optical disks (WORMs) cannot be erased. However, if data is written in a given sector, and the drive is requested to write the same sector again, the original data is corrupted, and lost forever. In normal operation, host computer software will prevent the overwriting of existing data.

However, in cases of software bugs, or other errors, an erroneous write could prove disastrous.

Checking that a sector is blank by reading it before writing it is unacceptably slow involving an extra disk revolution before each write operation.

Figure 4:
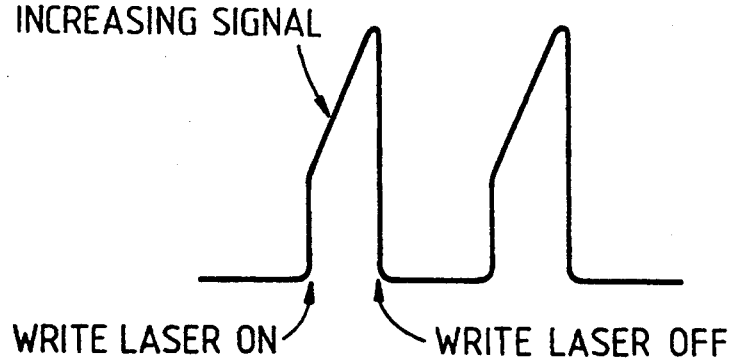
Figure 5:
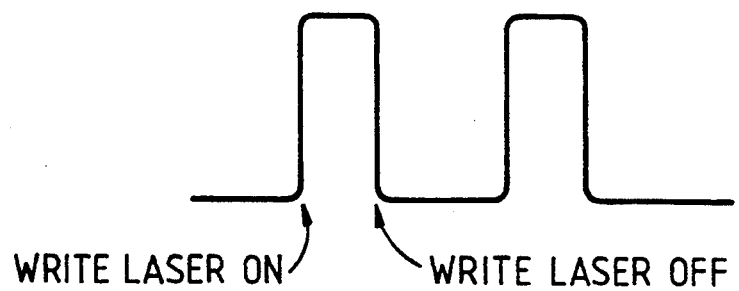

According to one embodiment of the present invention, marks are monitored as they are being formed on the disk surface. Mark formation is very rapid on the 'moth eye' surface (typically 5-20 ns). FIG. 4 shows marks being formed on Plasmon media. If the area of the disk is already written, the mark formation signal looks different (see FIG. 5).

By analysing the mark formation signal, and the differential of the mark formation signal, it is possible to distinguish between normal and overwrite conditions.

Figure 6:
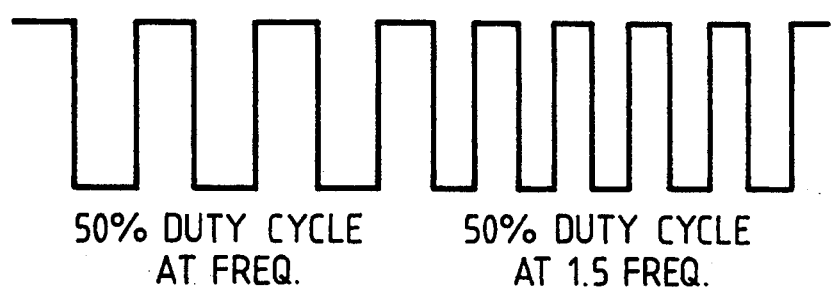

Using this method, it is only possible to detect when writing over an already written pulse. The read channel must therefore be observed between each write pulse for the presence of already written bits. By using a carefully chosen start up signal, it is possible to detect overwriting in all situations (see FIG. 6), before any user data is written.

It is therefore possible to prevent overwriting in hardware at the lowest possible level.

We claim:

1. A method of improving optical disk recording performance which comprises writing data to an optical disk with a write laser so as to form marks in the disk, reading said data immediately by monitoring the formation of said marks with a read photodiode during writing, characterized by the steps of:
   a) measuring an amplitude of a detected signal generated by said laser beam reflected from the marks being formed on the disk through said photodiode that is connected to a pulse detector.
   b) continually adjusting the power of said write laser in responding to the amplitude of the detected signal read by said photodiode.

2. A method according to claim 1, further characterized by the step of:
   c) sending an electrical signal to a warning system to notify an operator or to a computer interface when the power of said laser is higher or at a predetermined level.

3. A method according to claim 2, further characterized by the step of:
   i) arranging said pulse detector so as to enabling the counting of number of abnormal marks formed.

4. A method according to claim 2, further characterized by the step of:
   j) detecting the existence of marks in an area of the disk being written with said pulse detector.

5. A method according to claim 2, further characterized by the step of:
   k) detecting the existence of marks in an area of the disk to be written with said pulse detector.

6. A method according to claim 5, further characterized by the step of:
   n) avoiding overwriting the area of the disk in responding to a pulse generated by said pulse detector.

7. A method according to claim 1, further characterized by the step of:
   d) arranging said pulse detector so as to enable the counting of number of abnormal marks formed.

8. A method according to claim 7, further characterized by the step of:
   e) triggering a verifying sequence when the number of abnormal marks is more than a predetermined number of abnormal marks.

9. A method according to claim 1, further characterized by the step of:
   f) detecting the existence of marks in an area of the disk being written with said pulse detector.

10. A method according to claim 9, further characterized by the step of:
    h) avoiding overwriting the area of the disk in responding to a pulse generated by said pulse detector.

11. A method according to claim 9, further characterized by the step of:
    l) avoiding overwriting the area of the disk in responding to a pulse generated by said pulse detector.

12. A method according to claim 11, further characterized by the step of:
    o) avoiding overwriting the area of the disk in responding to a pulse generated by said pulse detector.

13. A method according to claim 1, further characterized by the step of:
    g) detecting the existence of marks in an area of the disk to be written with said pulse detector.

14. A method according to claim 13, further characterized by the step of:
    m) avoiding overwriting the area of the disk in responding to a pulse generated by said pulse detector.

15. A method of improving optical disk recording performance which comprises:
    writing data to an optical disk with a write laser so as to form marks in the disk;
    continually monitoring the condition of the disk surface area about to be written to or being written to by observing the area with a read photodiode;
    measuring the amplitude of a detected signal generated by said laser beam reflecting from the disk surface using a pulse detector connected to said photodiode;
    continually adjusting the power of said write laser in response to the amplitude of the detected signal read by said photodiode during the write operation;
    providing a signal to notify the operator when the degree of said adjustment to the power of said write laser equals or exceeds a predetermined level;
    providing a signal to notify the operator when the power of said write laser equals or exceeds the maximum allowable level;
    detecting abnormalities in the mark being formed;
    counting said abnormalities;
    triggering a verifying sequence if more than a predetermined number of abnormally formed marks are detected;
    detecting whether the area of said disk about to be written to has already been written to; and
    inhibiting the write laser in response to the signal generated by said pulse detectors to avoid the overwriting of the disk.

* * * * *